United States Patent [19]

Keifert et al.

[11] 4,073,427
[45] Feb. 14, 1978

[54] LINED EQUIPMENT WITH TRICLAD WALL CONSTRUCTION

[75] Inventors: Hibbard G. Keifert, Torrance, Calif.; Einar R. Jenstrom, Bridgewater, N.J.

[73] Assignee: Fansteel Inc., North Chicago, Ill.

[21] Appl. No.: 730,347

[22] Filed: Oct. 7, 1976

[51] Int. Cl.² .................. B23K 31/02; F16B 5/08
[52] U.S. Cl. ......................... 228/165; 228/175; 228/187; 228/189; 220/63 R; 403/272
[58] Field of Search ............. 228/165–169, 228/173, 175, 189, 187; 220/63 R; 403/272; 285/286

[56] References Cited
U.S. PATENT DOCUMENTS

| | | | |
|---|---|---|---|
| 3,443,306 | 5/1969 | Meyer | 228/165 |
| 3,474,344 | 10/1969 | Perl | 228/184 |
| 3,596,793 | 8/1971 | Kocher et al. | 220/63 R |

FOREIGN PATENT DOCUMENTS

| | | | |
|---|---|---|---|
| 1,223,404 | 2/1971 | United Kingdom | 228/165 |
| 903,935 | 8/1962 | United Kingdom | 228/189 |

*Primary Examiner*—Donald G. Kelly
*Assistant Examiner*—K. J. Ramsey
*Attorney, Agent, or Firm*—Barnes, Kisselle, Raisch & Choate

[57] ABSTRACT

An improved wall construction and method of fabrication is disclosed in which a wall assembly is comprised of a base metal layer of mild steel with a bonded intermediate layer of copper and a bonded layer of corrosion resistant material containing a fusion weld joining the steel base metal members with the root of the fusion weld abutting an inlaid insert of the corrosion resistant material, a fusion weld joining the layer of corrosion resistant material of the members to each other and to the inlaid insert of corrosion resistant material to provide a relatively smooth surface in the corrosion resistant layer, with the intermediate copper layer removed from the weld areas.

16 Claims, 14 Drawing Figures

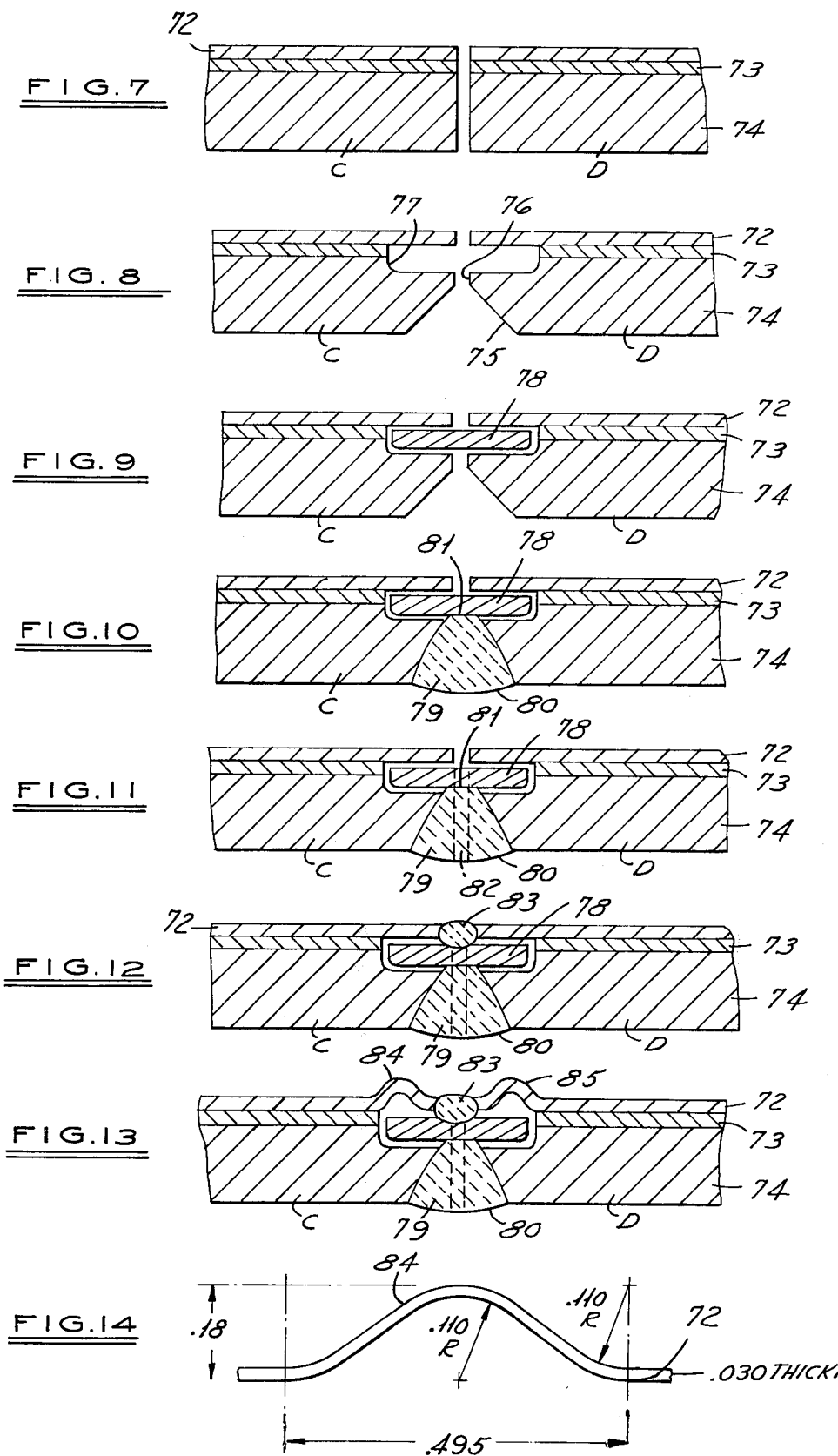

LINED EQUIPMENT WITH TRICLAD WALL CONSTRUCTION

This invention covers an improved wall assembly and method of construction for the fabrication of industrial equipment that has walls comprised of two or more layers of material, especially for chemical process equipment.

The method relates to improvements in welded joints in equipment in which a surface layer of special purpose metal or alloy, such as a metal having high corrosion resistance, is used in conjunction with, and is metallurgically bonded to, a backing of a more common base metal. The invention especially relates to improved wall constructions with a surface liner or facing of a dissimilar material to that of the backing, principally to cases where the facing material is not generally metallurgically compatible with the backing material, and it principally relates to the incorporation of an intermediate layer of a second base metal between the surface facing of the special purpose metal and structural base metal material.

The improved method of fabrication described herein can be applied to any extremely large number of dissimilar metal combinations. Some of the combinations include: tantalum, columbium, vanadium, titanium, zirconium or hafnium, or their alloys, as liners or layers on mild steel; tantalum or columbium liners or layers on copper-base alloys; tantalum plus copper layers on mild steel; and tantalum layers on nickel or nickel-base alloys, or on cobalt-base alloys. The improved method is versatile. The liner or layer of the special purpose metal or alloy may be bonded by techniques including explosive cladding (such as by the Detaclad process, trademark of E. I. duPont de Nemours and Co.), and roll bonding to the backing, and brazing, such as with silver brazing alloys; or the lining or facing may simply be in close contact as an unbonded, loose, or thermal-expansion compensated lining.

The use of such a special purpose metal or alloy lining or facing on a more common base metal backing is well known in the state-of-the-art. However, methods for fabrication of such equipment present severe problems, especially at joints when the lining material is not generally metallurgically compatible with the backing material. To define the statement "not generally metallurgically compatible," consider the case of a tantalum liner or layer on a mild steel backing. The melting points of these materials differ widely. Tantalum melts at about 3000° C (5430° F), and mild steel melts at about 1530° C (2790° F); mild steel has a coefficient of thermal expansion about twice that of tantalum; and iron and tantalum do not alloy to produce ductile alloys (the tantalum-iron phase system contains the intermetallic compound $Ta-Fe_2$ and eutectics between this compound and the very limited solid solubility, terminal solid solutions — see FIG. 11, p. 461, "Columbium and Tantalum," by F. T. Sisco and E. Epremian, published by John Wiley and Sons, Inc., 1963).

To overcome these metallurgical incompatibilities, U.S. Patent No. 3,443,306 utilizes a copper layer about 0.060 inch thickness between the tantalum and the steel base. In this patented method of weld assembly, the thickness of the copper layer is critical, and the technique applies only to the specific triclad construction described in which the copper intermediate layer must be integrally bonded to both the steel substrate and the outer tantalum layer. The final weld joint contains an outer projecting battan strap of tantalum which is joined by fillet welds to the underlining tantalum cladding. The fillet welds at the ends of the projecting battan strap cannot meaningfully be X-ray inspected for code weld quality so techniques such as soap tests, helium leak tests with a mass spectrometer, or penetrant dye tests are used to monitor weld quality.

One principal object of the present invention is to provide a versatile method of fabrication for fusion welding of equipment comprised of a combination of a lining or facing of a special purpose metal or alloy, especially the refractory metals and reactive metals and their alloys, and a ferrous or non-ferrous base metal on which the lining or facing material may either be bonded or unbonded.

An additional object is to provide a method of fabrication that will simplify and improve the fitup of the lining or facing in joining either bonded or unbonded equipment in which the wall is constructed of two or more layers.

Another object is to provide a method of fabrication to produce sound, high-quality, contamination-free welds independently in the base metal and in the lining or facing.

A further object is to provide a method for fabrication of such above mentioned combinations of dissimilar metals or alloys so as to achieve a final smooth geometry in the finished welded assembly that will not have projections or surface irregularities such as batten straps, especially on the process side of chemical process equipment.

An additional object is to provide an improved method for fabrication of a wall in which an additional base metal material is incorporated between the lining or facing and the principal structural base metal material of the wall, especially in combinations such as a tantalum facing explosively bonded to an intermediate copper layer, which also is explosively bonded to a mild steel base metal.

These and other objects provided by this improved method of fabrication will be apparent to those skilled in the art by the following description of drawings and examples.

FIGS. 7 through 12 show the sequential steps in preparing the wall construction in another principal embodiment of this invention.

FIG. 13 illustrates the use of convolutions formed into the special purpose lining material as an additional improvement to all embodiments of this invention.

FIG. 14 shows the typical form contour of convolutions in the lining material.

The figures and examples will be given as specific embodiments in which a tantalum material is employed as the lining or facing material and mild steel or other iron-base alloys as the backing material. Tantalum-lined chemical process equipment has been used in a number of chemical process applications where the tantalum lining provides corrosion resistance to the corrosive environment. But because of the high cost of tantalum, thin liners or layers of this special purpose material are used to resist the corrosive conditions, and a low cost base material, commonly mild or plain carbon steel, is used as the backing and principal structural member of the equipment. Such typical chemical process equipment includes bayonet heaters, heat exchangers, condensers, towers, columns and other vessels, piping, fitting and valves.

In the specific embodiments described in the examples, the lining is formulated of tantalum or a tantalum alloy such as Fansteel "63" Metal manufactured by Fansteel Inc., which contains 2.5 weight percent tungsten, 0.15 weight percent columbium, with the balance being essentially tantalum as discussed in commonly assigned U.S. Pat. No. 3,592,639. Fansteel "63" Metal has about 50 percent higher ultimate tensile strength and about twice the yield strength compared to unalloyed tantalum at a temperature of about 200° C (390° F), which is a typical process temperature in some chemical applications. This alloy generally shows at least equivalent corrosion resistance to pure tantalum in many environments.

While the lining materials described is tantalum or Fansteel "63" Metal in the specific examples, it should be apparent to those skilled in the art that the methods of fabrication described in this invention can be equally well utilized when the lining material is any ductile, fabricable and weldable refractory metal or alloy, including other tantalum-base alloys, columbium and columbium-base alloys, vanadium and vanadium-base alloys, and also the reactive metals titanium, zirconium, hafnium, and alloys having these reactive metal bases.

Also the specific embodiment and examples that are described cite mild steel as the structural backing material. Again, it should be apparent that backings of this invention can be other common base metals, such as other steels, including stainless steels, copper-base, nickel-base and cobalt-base materials, or can be a refractory metal or reactive metal, or their alloys, different from that of lining material.

EXAMPLE 1

Figure 1:
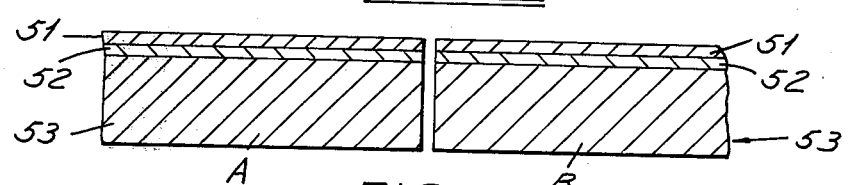
FIGS. 1 through 5 show the sequential steps in fabricating the wall assembly in one embodiment of this invention.

FIG. 1 shows member A having a facing layer 51 of Fansteel "63" Metal, about 0.030 inch thickness that has been explosively clad to an intermediate copper layer 52, which is approximately 0.060 inch thickness which in turn has been explosively clad to the mild steel backing 53. The steel backing can commonly range from ¼ to 1 inch thickness; however, thicker or thinner steel backings are utilized in some cases. Member B in FIG. 1 is constructed from the same materials. The adjacent edges of members A and B are first prepared flush and parallel to each other.

Figure 2:
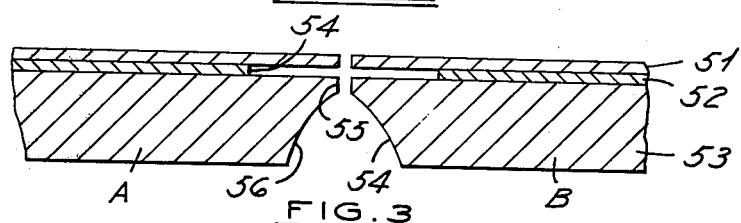

The next steps in the preparation of the members are illustrated in FIG. 2. This shows the copper layer 52 of both members etched or machined back a distance to position 54, which is a minimum of about ½ inch from the abutting edge of each member.

The copper can be selectively etched without significantly attacking the tantalum layer or steel with a solution such as nitric acid plus sulphuric acid (plus water in some solutions); the mixed acid solutions listed on pages 774 and 775 of the "Corrosion Handbook" by H. H. Uhlig can be used as a guide to establish the preferred mixed acid solution and the time to dissolve the copper back the desired distance. This technique can be used when a tantalum material insert of the same thickness as the intermediate copper layer is to be utilized in the wall construction. If it is desired to employ a thicker tantalum material insert in the wall construction, a solution such as 50% nitric acid and 50% water can be used to dissolve both copper and some steel first, and then follow this with the nitric acid and sulphuric acid solution to preferentially dissolve the remainder of copper to be removed.

Next, as further illustrated in FIG. 2, the steel base metal is machined to provide root face 55 and a groove face 56 to both members A and B. The specific joint geometry used for the steel backing is in accordance with "Recommended Proportions of Grooves for Arc Welding," Welding Handbook, Sixth Edition, Section 1, American Welding Society.

Figure 3:
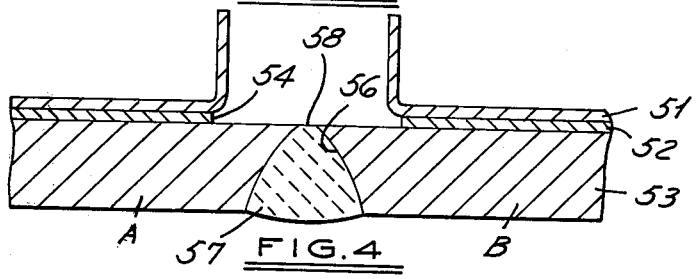

FIG. 3 illustrates the next steps. The formerly abutting edges of the tantalum material liner are bent upward, as illustrated, and then the steel fusion butt weld 57 is made. The welding procedure used for the steel backing is in accordance with the recommended practice of the above cited Welding Handbook in order to produce code quality welds. Any excess weld metal at the root of the steel weld is removed to achieve a flush surface 58. Weld reinforcement on the exterior or face side of the steel weld may or may not be dressed down smooth with the outside surface of steel base metal sections A and B. Normally, the steel butt weld will be inspected for quality by X-ray techniques, and any defective areas will be repaired before proceeding to the next step.

For convenience purposes and to avoid damage to the tantalum alloy lining, it is optional and may be preferable to bend up the edges of the tantalum alloy liner as illustrated in FIG. 3 before machining the root and groove faces of the steel base metal as illustrated in FIG. 2.

Figure 4:
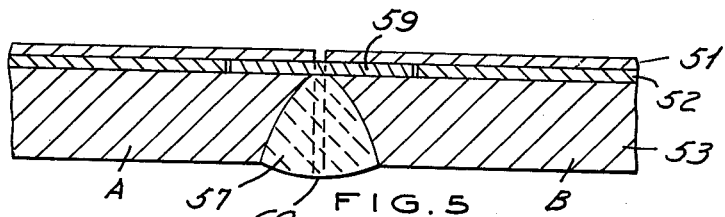

In the next steps, illustrated in FIG. 4, an insert of tantalum alloy material 59 of the same composition as the tantalum facing layer 51 is placed in the groove 54 formed by etching or machining of the copper, or copper and some steel, depending on the desired thickness of the tantalum material insert 59. In the illustration in FIG. 4, the insert 59 is shown as tantalum material having the same thickness as copper layer 52, about 0.060 inch thickness in this specific example.

Next, purging holes 60 are machined through steel weld 57 and tantalum material insert 59 to provide protection at the underside or root side of the weld to be made in the tantalum material liner 51. These purging holes are normally left open even after completing the welded wall assembly since they then serve a second purpose being used for leak detection during subsequent service of the fabricated equipment.

Before placing inlay 59, all contaminants such as steel chips, oil or grease and other soils must be thoroughly removed from the channel 54 by techniques such as degreasing. The tantalum material inlay 59 and the tantalum material liner 51 must also be cleaned and free from any foreign contaminants. Then, the bent-up edges of the tantalum liner 51 are bent down in flush contact with the inlay or insert 59 as illustrated in FIG. 4.

Adequate cleaning of the tantalum material and inert shielding is mandatory in welding tantalum and tantalum alloys. The tantalum material can be chemically cleaned by pickling in an acid solution comprised of:

Nitric Acid (70%); 3 parts by volume (60% by volume)

Sulphuric Acid (95%); 1 part by volume (20% by volume)

Hydrofluoric Acid (48%); Up to 1 part by volume (Up to 20% by volume)

Following the acid immersion, the tantalum material should be removed from the acid solution and immediately immersed in clean water. The final water rinse should be done with the water temperature above 50° C (125° F). Following the water rinsing, the material should be rinsed in alcohol followed by drip drying and wiping of the excess alcohol from the surface using lint-free, clean white cloth.

Tantalum materials can be successfully fusion welded using techniques such as inert gas shielded tungsten arc welding, or electron beam welding. The inert gas shielded tungsten arc welding (often called TIG or GTA welding) is the most commonly used procedure and is used in the embodiment described. The region of the tantalum alloy material to be welded is evacuated and purged with an inert gas, generally argon, but the inert gas can be any one or a mixture of inert monatomic gases such as argon, helium, neon, krypton or xenon.

If feasible, the entire assembly to be welded can be placed in a chamber which is evacuated and back filled with the inert gas. Alternately, a plastic bag or sheet can be taped to the liner or facing of both members A and B. A hose is fitted into the bag to inflate and purge the bag and the areas to be welded. An additional hole in the bag permits any residual air to exit, and the flow of argon is continuous so as to purge out any residual contaminants.

The inert gas should be used to purge the root side of the weld in the tantalum layers. The welding torch is inserted into an additional hole in the bag to make the weld in the tantalum material.

This procedure can be used to generate a good quality, complete penetration butt weld in the tantalum material facing layer. It is especially important in making the weld in tantalum material to be sure there is no contamination on the tantalum material anywhere in the vicinity of the area heated by the welding torch.

Figure 5:
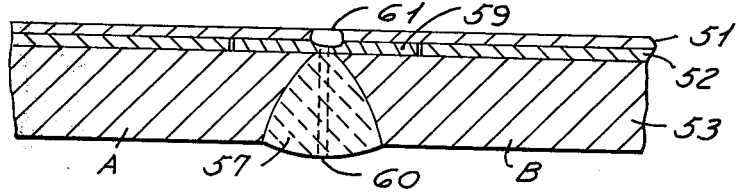

This technique can be applied to wall assemblies of this invention where the tantalum material layer is metallurgically bonded to an intermediate copper layer, which in turn is bonded to the steel base metal with bonding done by techniques such as explosive cladding or roll bonded. In these cases, it is especially important that the faces of the tantalum layer 51 that had been in bonded contact with copper layer 52 be free from any copper contaminations before making the fusion butt weld 61 in the tantalum material illustrated in FIG. 5.

The fusion butt weld 61 is made under the conditions described above to join layer 51 on the two members to each other. This weld also has adequate root penetration to abut to the inlay insert 59 in order to generate a good quality weld.

Additional filler material of the same composition as facing layer 51 may be added when making the fusion butt weld 61.

Next, the tantalum alloy weld is inspected by penetrant dye inspection and X-ray radiographs for the presence of any defects in the weld. Such inspections should show a sound and defect-free weld. Any defective areas, if found, should be repaired and inspected again in order to insure the achievement of high quality welds in the finished wall assembly.

COMPARISON TO STATE-OF-THE-ART

Figure 6:
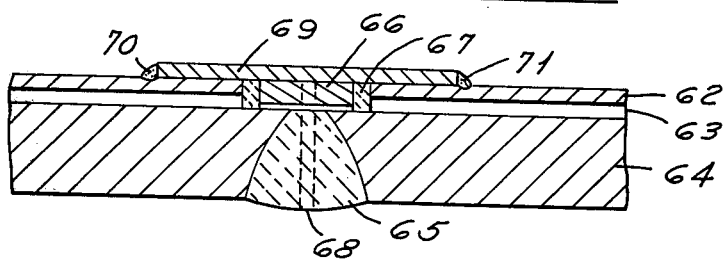
FIG. 6 shows a prior art method.

FIG. 6 shows the state-of-the-art welded wall joint assembly according to the teachings of U.S. Pat. No. 3,443,306. The completed assembly is comprised of a triclad bonded wall with a tantalum layer 62 bonded to an intermediate copper layer 63 which is bonded to the steel substrate 64. The two members of the wall are joined by fusion butt weld 65 in the steel members.

A filler piece 66 is placed in a channel in the tantalum and copper layers, and the space between this filler piece and the tantalum and copper layers is filled with the silver brazing alloy 67.

Purging holes 68 are used to flush the root side of the tantalum alloy fillet welds. An overlay battan strap 69 of tantalum is joined to tantalum layer 62 by fillet welds 70 and 71 to complete the welded wall assembly.

This state-of-the-art wall assembly is limited to the specific triclad tantalum and copper and steel type of material and requires critical ranges of thicknesses in the tantalum and the copper layers to successfully make the welded wall assembly.

Compared to the method of the prior art illustrated in FIG. 6, the method of the present invention is not limited to the specific triclad material construction, but instead can be applied not only to this material combination, but also to a vast number of compositions of dissimilar materials, and can be used with either bonded or unbonded layers of materials.

Furthermore, the wall construction of this invention provides a relatively smooth and flush surface on the special purpose material or process side without a projection such as a battan strap, such as shown in FIG. 6.

Additionally, in the wall assembly of this invention the thickness of the layers of material is not critical to achieve a sound welded wall construction.

As mentioned in the cited prior art, the thickness of the tantalum and copper layers are critical. By contrast, in this invention they are not critical. Instead, the thickness of the tantalum layer is governed by consideration of corrosion resistance and desired corrosion life of the equipment. The thickness of the intermediate copper layer is essentially of no significance because the copper layer is removed from the area to be welded. The only principal significance to the thickness of the copper layer in this invention is whether the etching or machining that is done to provide space for insertion of the tantalum material inlay insert requires removal of the copper layer only, or both the copper layer and some of the underlying steel base metal.

In addition, the method of this invention incorporates butt welding of the individual layers of the wall construction. Butt welding of the tantalum liner provides a much stronger joint than a fillet weld type construction illustrated in state-of-the-art type wall construction in FIG. 6. The fatigue or endurance strength of a fillet weld is only about 20 percent that of a butt weld (R. Weck, "Avoiding Failures in Welded Construction," Metals Progress, Volume 109, No. 4, April 1976, pp. 24–43). Thus, methods of this invention provide a wall construction with improved strength and good integrity in each of the layers of the construction.

EXAMPLE 2

FIGS. 7 through 12 show sequential steps in fabricating another preferred embodiment of the wall assembly of this invention.

FIG. 7 shows member C having a Fansteel "63" Metal layer 72 bonded to intermediate copper layer 73, which in turn is bonded to the steel substrate 74 in both members C and D.

As shown in FIG. 8, groove face 75, root face 76, and channel 77 are machined in the two members.

Next, as illustrated in FIG. 9, a "63" Metal inlay insert 78 is placed in channel 77 and telescopes under the tantalum material layer 72 when the two members are brought together. This specific embodiment is most applicable when it is desired to use a thicker inlay insert than in Example 1.

Typically under Example 2, the insert will be in the area of 0.090 to 0.125 inches thick, although thinner or thicker inserts may be used, if desired. The insert 78 will substantially fill the channel 77 but is shown in the drawings with space around it to signify that it is not bonded on the contiguous surfaces.

All precautions used in fabricating the welded wall assembly are covered in the procedures described in Example 1.

FIG. 10 shows the next step in the sequence, which is to make fusion butt weld 79 joining members C and D. The joint preparations and welding procedure follow the recommendations of the welding handbook described in Example 1. The weld reinforcement 80 on the face of steel weld 79 may or may not be machined flush with the outer surface after completing the weld.

The root of steel weld 79 is made directly against the tantalum material insert 78 which acts as a backer. Since the tantalum material has a much higher melting point than steel, there is essentially no alloying between the tantalum and steel at the weld root interface 81.

Next, as illustrated in FIG. 11, purging holes 82 are drilled through steel weld 79 and the tantalum material inlay insert 78. These purging holes are used to flush the inside or root side of the weld in the tantalum material. These purging holes are normally left open even after completing the welded wall assembly since they then serve a second purpose for being used for leak detection during service.

A fusion butt weld 83, as illustrated in FIG. 12, is made under inert gas, as described in Example 1, to join tantalum layer 72 of members C and D to each other, and also to the tantalum material inlay insert 78 at the root of the tantalum material weld. If necessary in making this weld, additional filler material of the same composition as the tantalum facing layer may be added to insure that a sound and full penetration weld is achieved.

Compared to the prior art welded wall assembly described in FIG. 6, the improved welded wall assembly in Example 2 of this invention offers all of the same advantages as described under Example 1. In addition, in the embodiment of Example 2, the tantalum inlay insert 78 is subsequently held in a fixed position by the steel weld 79 abutting at interface 81, and by the tantalum material weld 83 which bonds the tantalum material layer to the inlay insert.

EXAMPLE 3

An additional further improvement in the wall construction of this invention that can be applied to either Examples 1 and 2 is the incorporation of a convolution 84 in the tantalum layer of one member and a convolution 85 in the tantalum layer of the other member to be joined. This improvement is illustrated in FIG. 13. These convolutions serve the purpose of acting as bellows during the expansion and shrinkage that occurs in fabricating the original wall assembly by the methods described, but they also subsequently serve as bellows to compensate for the differences of coefficient of thermal expansion between the tantalum and steel when the equipment comprised of this wall assembly is heated to and cooled from the process service temperature.

FIG. 14 shows the preferred dimension for each convolution when formed in a tantalum material having a thickness of about 0.030 inch.

Fabricating a wall of this invention has been illustrated by using specific types of material by way of example, but the wall construction is not limiting since the method and the wall construction described can be applied to a broad spectrum of materials as covered by the claims.

We claim:
1. A joint for a wall assembly comprising:
    (a) abutting edges of a composite wall of a first layer of a first metallic material, an intermediate layer of a second metallic material, and a third layer of a third metallic material, with one face of the first and third materials in a face-to-face relation with a face of the second material, and a channel formed in an area adjacent the edges of the first and third layers extending into the intermediate layer between the first and third layers, the third layer being metallurgically incompatible with and not directly weldable to the first layer,
    (b) an inlaid insert of a material selected from metals and alloys comprising titanium, zirconium, hafnium, tantalum, columbium, and vanadium in said channel bridging the abutting edges of and supported between the first and third layers in the area adjacent the abutting edges.
    (c) a fusion weld joining the edges of the first layer of the wall assembly to each other, and
    (d) a fusion weld joining the edges of the third layer of the wall to each other and to said inlaid insert.
2. A joint for a wall assembly comprising:
    (a) abutting edges of a composite wall of a first layer of a first metallic material, an intermediate layer of a second metallic material, and a third layer of a third metallic material, with one face of the first and third materials in a face-to-face relation with a face of the second material, and a channel formed in an area adjacent the edges of the first and third layers extending into the intermediate layer between the first and third layers, the third layer being metallurgically incompatible with and not directly weldable to the first layer,
    (b) an inlaid insert in said channel bridging the abutting edges of and supported between the first and third layers in the area adjacent the abutting edges, said inlaid insert being formed of the third metallic material,
    (c) a fusion weld joining the edges of the first layer of the wall assembly to each other, and
    (d) a fusion weld joining the edges of the third layer of the wall to each other and to said inlaid insert.
3. A joint for a wall assembly as defined in claim 1 in which the fusion weld joining the abutting edges of the first layer of first material abuts and is welded directly against the inlaid insert at the weld root.
4. A joint for a wall assembly as defined in claim 1 in which the layer of first metallic material is selected from an iron-base, nickel-base, cobalt-base and copper-base material, the second material is copper, and the third metallic material is selected from metals and alloys comprising titanium, zirconium, hafnium, tantalum, columbium and vanadium.
5. A joint for a wall assembly as defined in claim 1 in which the layer of second metallic material has a melt- ing point lower than the first metallic layer material and the third metallic layer material.

6. A joint for a wall assembly as defined in claim 1 in which the layer of first material is an iron-base alloy, the layer of second material is copper, and the layer of third metallic material is a tantalum-base material.

7. A joint for a wall assembly as defined in claim 1 in which the channel in which the inlaid insert is placed extends entirely through the second layer to eliminate weld contact with the insert of any of the second layer metallic material.

8. A method of fabricating a wall assembly comprising abutting edges of a layer of first metallic material, an intermediate layer of second material, and a layer of third metallic material, with one face of the first and third layers having one face in a face-to-face bonded relation with a face of the intermediate layer, the third layer being metallurgically incompatible with and not directly weldable to the first metallic material, comprising the steps of:
(a) removing a portion of the intermediate layer for a distance of at least about 1/2 inch back from the abutting edge of members of the wall to be joined by welding,
(b) inlaying an insert of the third material in the channel so formed in the second material,
(c) fusion welding the abutting edges of the first layer to each other, the root of said weld abutting to the inlay insert of third material,
(d) machining purge holes through the fusion weld in the first material and the inlay insert of third material, and
(e) fusion welding under inert conditions, the abutting edges of the layer of third material to each other and to the inlay insert of third material.

9. A method of fabricating a wall as defined in claim 8 in which the fusion weld in the first material is made before inlaying the insert of third material.

10. A method of fabricating a wall as defined in claim 8 in which the channel in which the insert of third material is placed extends entirely through the second layer.

11. A method of fabricating a wall as defined in claim 8 in which the channel in which the insert of third material is placed extends entirely through the second layer and to a distance into the first layer.

12. A method of fabricating a wall as defined in claim 8 in which the layer of first metallic material is selected from an iron-base, nickel-base, cobalt-base and copper-base material, the second material is copper, and the third metallic material is selected from metals and alloys comprising titanium, zirconium, hafnium, tantalum, columbium and vanadium.

13. A method of fabricating a wall as defined in claim 9 in which the layer of second metallic material has a melting point lower than the first metallic layer material and the third metallic layer material.

14. A method of fabricating a wall as defined in claim 9 in which the layer of first material is an iron-base alloy, the layer of second material is copper, and the layer of third metallic material is a tantalum-base material.

15. A joint for a wall assembly comprising:
(a) abutting edges of a composite wall of a first layer of a first metallic material, an intermediate layer of a second metallic material, and a third layer of a third metallic material, with one face of the first and third materials in a face-to-face relation with a face of the second material, and a channel formed in an area adjacent the edges of the first and third layers extending into the intermediate layer between the first and third layers, the third layer being metallurgically incompatible with and not directly weldable to the first layer,
(b) an inlaid insert in said channel bridging the abutting edges of and supported between the first and third layers in the area adjacent the abutting edges.
(c) a fusion weld joining the edges of the first layer of the wall assembly to each other,
(d) a fusion weld joining the edges of the third layer of the wall to each other and to said inlaid insert, and
(e) a convolution being formed on one or more sides of the joint in the layer of third material in a direction parallel to the abutting edges.

16. A joint for a wall assembly comprising:
(a) abutting edges of a composite wall of a first layer of a first metallic material, an intermediate layer of a second metallic material, and a third layer of a third metallic material, with one face of the first and third materials in a face-to-face relation with a face of the second material, and a channel formed in an area adjacent the edges of the first and third layers extending into the intermediate layer between the first and third layers, the third layer being metallurgically incompatible with and not directly weldable to the first layer,
(b) an inlaid insert in said channel bridging the abutting edges of and supported between the first and third layers in the area adjacent the abutting edges,
(c) a fusion weld joining the edges of the first layer of the wall assembly to each other,
(d) a fusion weld joining the edges of the third layer of the wall to each other and to said inlaid insert, and
(e) a convolution adjacent and parallel to the abutting edges being formed in the layer of third material of each member to be joined.

* * * * *

UNITED STATES PATENT AND TRADEMARK OFFICE
CERTIFICATE OF CORRECTION

PATENT NO. : 4,073,427
DATED : February 14, 1978
INVENTOR(S) : Hibbard G. Keifert and Einar R. Jenstrom It is certified that error appears in the above-identified patent and that said Letters Patent are hereby corrected as shown below:

Claim 13 (Col. 9, line 54) change "9" to -- 8 --.

Claim 14 (Col. 10, line 4) change "9" to -- 8 --.

Signed and Sealed this

Sixth Day of June 1978

[SEAL]

Attest:

RUTH C. MASON
*Attesting Officer*

DONALD W. BANNER
*Commissioner of Patents and Trademarks*